Figure 1:
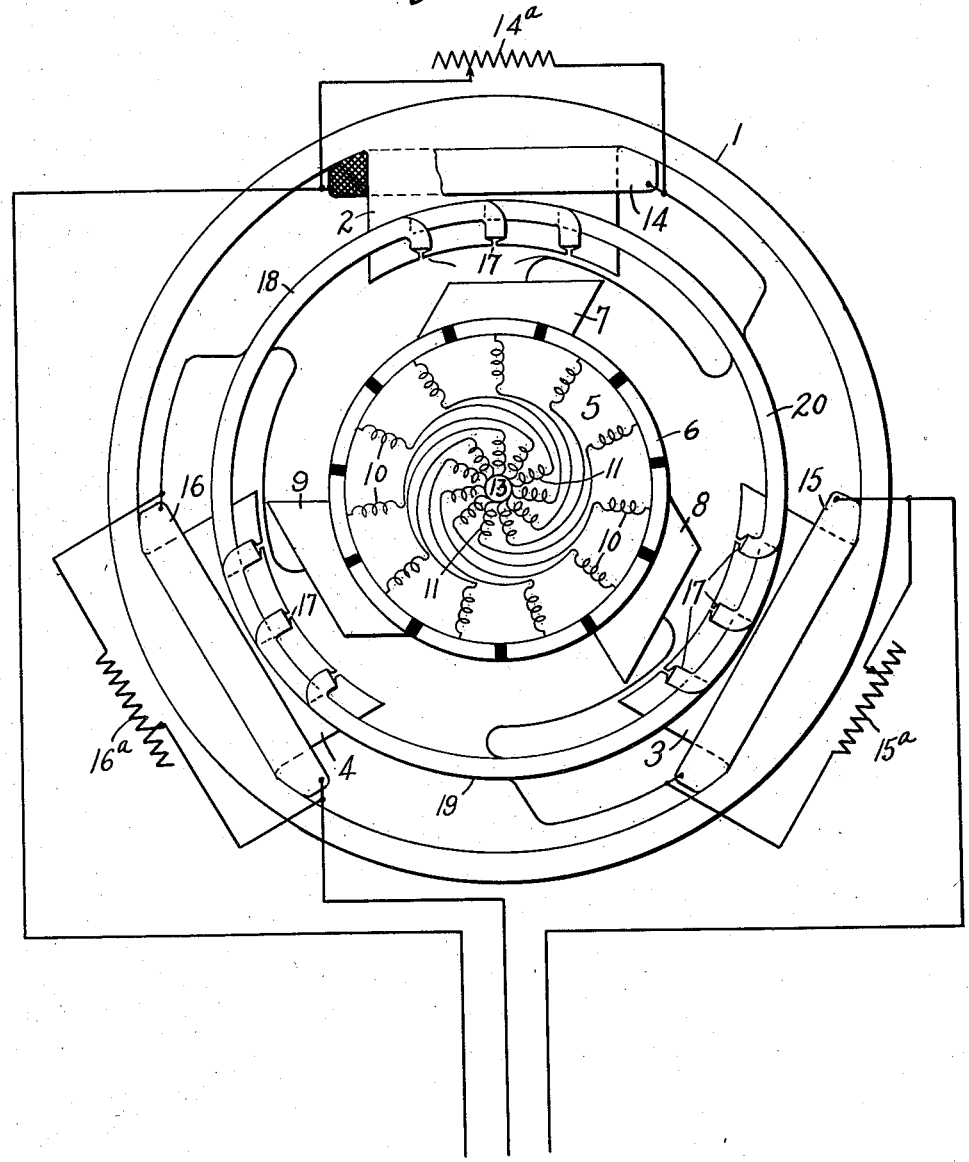

M. WALKER.
DYNAMO ELECTRIC MACHINE.
APPLICATION FILED DEC. 24, 1909.

1,145,721.

Patented July 6, 1915.
3 SHEETS—SHEET 1.

WITNESSES:
Fred H. Miller
O. W. Kennedy

INVENTOR
Miles Walker
BY
ATTORNEY

M. WALKER.
DYNAMO ELECTRIC MACHINE.
APPLICATION FILED DEC. 24, 1909.

1,145,721.

Patented July 6, 1915.
3 SHEETS—SHEET 3.

UNITED STATES PATENT OFFICE.

MILES WALKER, OF OLD TRAFFORD, ENGLAND, ASSIGNOR TO WESTINGHOUSE ELECTRIC AND MANUFACTURING COMPANY, A CORPORATION OF PENNSYLVANIA.

DYNAMO-ELECTRIC MACHINE.

1,145,721.

Specification of Letters Patent.

Patented July 6, 1915.

Application filed December 24, 1909. Serial No. 534,769.

*To all whom it may concern:*

Be it known that I, MILES WALKER, a subject of the King of Great Britain, and a resident of Old Trafford, in the county of Lancaster, England, have invented a new and useful Improvement in Dynamo-Electric Machines, of which the following is a specification.

My invention relates to dynamo-electric machines and it has for its object to provide a machine of this kind which shall be especially adapted for use as an exciter for alternating current induction motors and generators.

In the ordinary arrangement of primary and secondary circuits of an induction motor or generator, the primary winding only is connected to the supply circuit and a component of the current supplied to such winding is utilized to magnetize the magnetic circuit of the machine.

The power-factor of the energy absorbed by an induction motor, under the conditions just stated, is considerably below unity, and, with a view to improving the power factor or to produce a leading current, it has hitherto been proposed to supply magnetizing currents to the secondary windings of the machine by means of a plurality of mechanically driven auxiliary exciters.

Auxiliary exciters of the type above referred to are provided with armatures and commutators like those of direct current generators and supply alternating electromotive forces, the frequency of the currents traversing their field magnet windings being equal to the slip frequency of the induction motor or generator. Such operating conditions are most conveniently secured by connecting the field magnet winding of each of the auxiliary exciters in a circuit of the secondary member of the induction motor or generator which is traversed by current of a phase different from that of the circuit to which the armature of the same exciter is connected, the phase being so chosen as to produce a leading electromotive force in the exciter armature.

According to my present invention, I provide an auxiliary exciter consisting of a single machine which supplies current to all the circuits of the secondary winding of the induction motor or the corresponding winding of a generator. The armature of the exciter is similar, in general construction, to a direct current armature, being provided with a commutator which is connected to a winding lying in slots in the periphery of an iron core. The arrangement of the armature winding is similar to that of an "open coil" winding consisting of a plurality of coils, one terminal of each of which is so connected to a common point as to form a star connection, the other terminals being severally connected to the commutator bars.

The field magnet system of the machine is energized by series and compensating windings and comprises a plurality of poles, the number of which is either equal to or a multiple of the number of out-of-phase circuits of the secondary member of the induction motor or generator with which the exciter is to be associated. Commutator brushes, corresponding in number to the number of field magnet poles, are provided for collecting the current generated in the armature.

Figure 2:
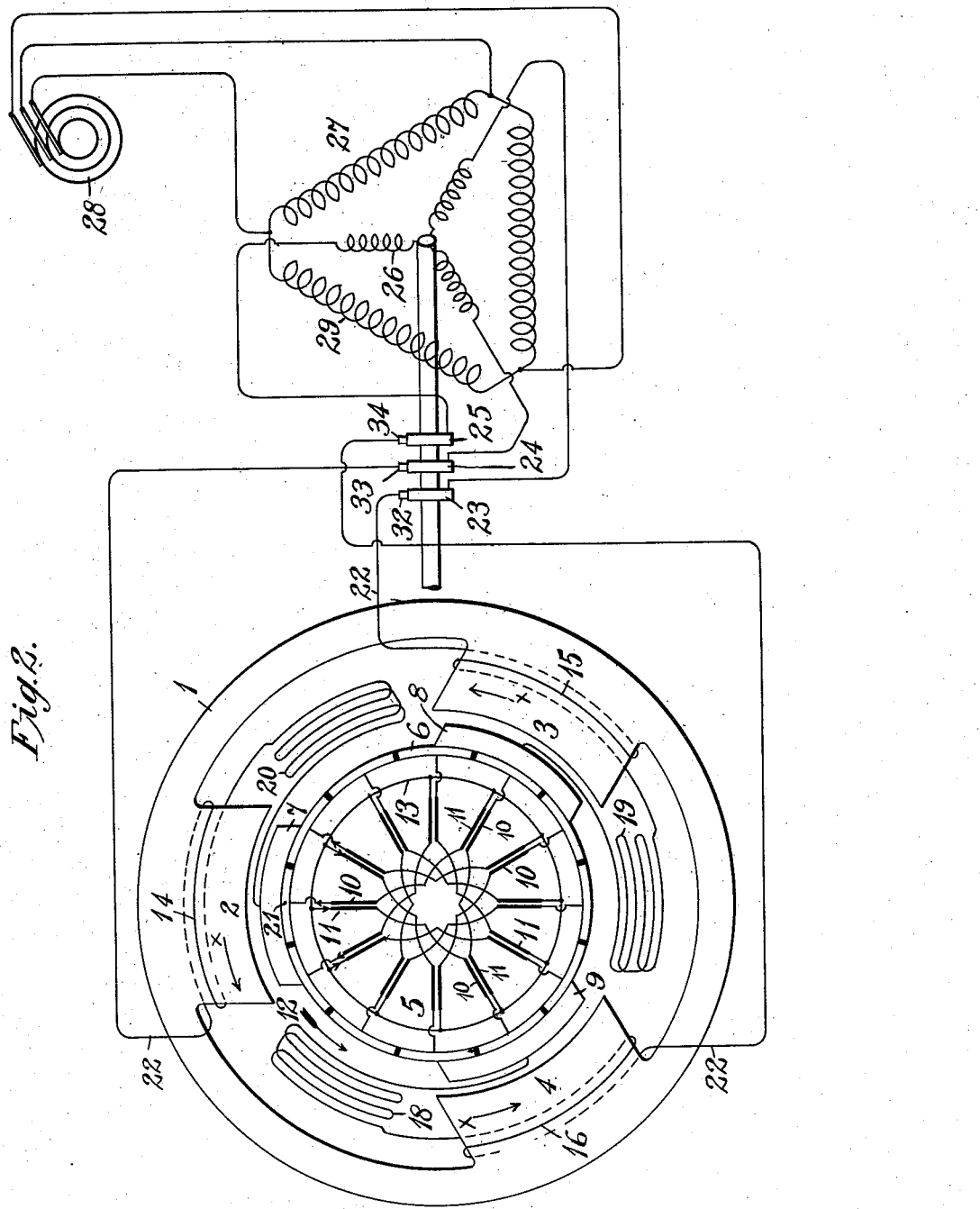
Figure 3:
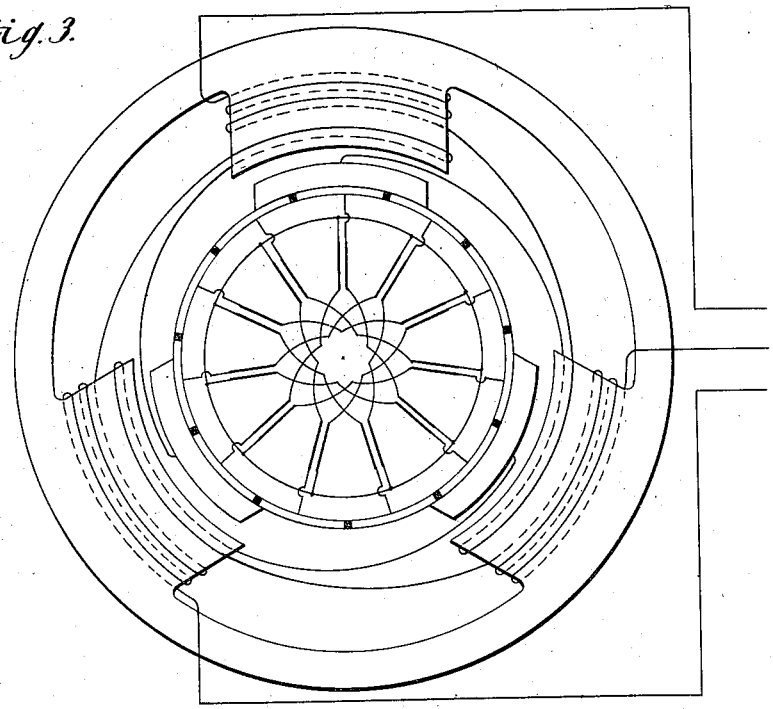
Figure 4:
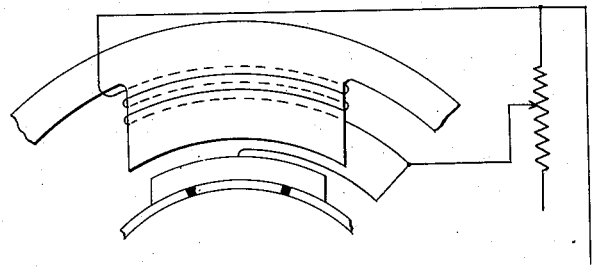

In the accompanying drawings, Figure 1 is a diagrammatic view of an exciter constructed in accordance with my invention and adapted to be connected to a three-phase induction motor or generator winding. Fig. 2 is a diagram showing the circuit connections of an induction motor or generator with which the exciter of Fig. 1 is associated. Figs. 3 and 4 are diagrams showing modifications of the circuit connections shown in Fig. 2.

Referring to Fig. 1 of the drawings, the dynamo-electric machine here shown comprises a field magnet frame 1 having three uniformly spaced inwardly extending polar projections 2, 3 and 4, an armature or rotor 5 having a commutator cylinder 6 and stationary commutator brushes 7, 8 and 9. The armature 5 is similar to the armature of a direct current dynamo-electric machine, its core being preferably constructed of laminated iron and provided with slots in its periphery for the reception of the armature winding. Each of the coils of the armature winding comprises two half coils 10 and 11 which are interconnected by a ring 13 at one end and are severally connected to the commutator bars at the other end. The coils are preferably arranged to have a pitch varying from the polar pitch for a purpose that will be hereinafter described. The field magnet pole pieces 2, 3 and 4 are respectively excited by means of series field magnet windings 14, 15 and 16 and are further provided with slots 17 in their faces, in which the compensating windings 18, 19 and 20 are located. Adjustable resistances 14ª, 15ª and 16ª are connected in shunt relation to the field magnet windings. Each of the commutator brushes 7, 8 and 9 is sufficiently wide to span all the commutator segments which are connected to coils lying under one pole piece and is connected in series with the corresponding compensating windings and field magnet winding to a terminal 22 of the machine, as shown in Fig. 2, to which reference may now be had.

The circuit for one of the phases of the machine may be traced as follows: from the interconnecting ring 13 through one of the armature coils, the conductors of which lie, respectively under the poles 3 and 2, through a commutator bar 21, brush 7, compensating winding 20, and series field magnet winding 14, to one of the exciter terminals 22. The circuits for the other phases of the machine can readily be traced from the drawing in a similar manner and need not be further described.

The terminals of the machine are respectively connected to slip rings 23, 24 and 25 or other terminals of the three-phase winding 26 of the secondary member of an induction motor or generator 27. In order to make the current in the rotor of the induction motor, to which the exciter is connected, lead the electromotive force generated by the rotor slip, it is necessary to have regard to the order of the rotation of the phases of the motor circuits and also to the direction of the electromotive force generated by the armature of the exciter for a given state of excitation of the exciter's field poles.

In Fig. 2, it is assumed that the order of rotation of the phases is such that the poles are excited in succession in the order 2, 4, 3, the direction being indicated by arrows X. Further, it is assumed that, for the direction of rotation of the armature indicated by the arrow 12, the windings are such that the direction of the electromotive force generated in the half coils 10 under the brush 7, is outward at the instant that the current is passing away from the ring 13. Considering only one of the phases of the machine, the flux produced by the current traversing the series field winding 14 will create a flux through the field magnet pole 2, thereby generating an electromotive force in the conductors of the armature winding under this pole. An electromotive force is similarly generated in the armature conductors which are subject to the flux through the field magnet pole 4, and the resultant electromotive force created by the flux from the poles 2 and 4 will be of such phase as to produce a leading current in the circuit of the secondary winding of the induction motor or generator to which the commutator brush 7 is connected. The electromotive force generated in each of the circuits of the exciter machine is therefore the resultant of the electromotive forces generated by fields due to the currents in two out-of-phase circuits. It will be noted that the brushes 7, 8 and 9 are sufficiently wide to cover several commutator bars and that they therefore connect a corresponding number of armature circuits in parallel with one another. When a plurality of armature circuits are connected in this way, it is usually difficult to insure that the current passing through the brush shall be divided uniformly among all the circuits, since the current tends to be greater in the circuit of those coils which are under the trailing pole tip on account of the greater flux at this point by reason of the armature reaction, and the compensating windings 18, 19, 20, serve to equalize the current in all the conductors under a single pole. If, for instance, the current in the conductors 10 and 11, under the middle of poles 2 and 3, is less than the average current in all the conductors passing under these poles, the compensating coil 20 strengthens the field in which the armature coils approaching the middle position are moving. It is, in fact, possible, by making any particular distribution of current in the compensating winding, to produce a somewhat similar distribution of current in the armature winding beneath the pole, thus giving great facility in arranging the commutating properties of the machine. For instance, the flux through the leading pole tip can be slightly strengthened in each case so as to make an incoming coil quickly take up its proper load on reaching the said pole tip.

The commutation is induced in the following manner: The brushes are rocked forward until the electromotive force generated in the armature coil which is about to leave the brush is so much less than the electromotive force in the coils still under the pole that the current in the former coil sinks to zero before the commutator segment, which is connected thereto, is actually disconnected from the brush. As the machine is series-wound, the field is approximately proportional to the current at any instant, so that theoretically good commutating conditions are insured on all loads. It will be seen that, with counter clockwise rotation, of the armature coil has a span greater than the pole pitch as shown in Fig. 1, one limb 10 of a coil may be still under pole 4 while the other limb 11 has passed the tip of the pole 2, thus making the commutating electromotive force proportional to the current in coil 14 and independent of that in coil 16, which is in a different phase. In actual practice, the parts of the commutator brush which are underneath the pole are preferably made of a compressed composition of metal and carbon, which is found to give a low-voltage drop between the brush and the commutator, while the part of the brush at which sparking might occur, owing to small errors in the adjustment of the commutation, is preferably composed of carbon. With brushes of this character and of great breadth, it is possible, under good theoretical commutating conditions, to employ a commutator of very much smaller dimensions than would be possible if the commutation were forced by means of narrower brushes of high resistance, in the usual manner.

In the figure, only one series field winding is shown on each pole, but it is, of course, possible to employ additional coils connected in any of the out-of-phase circuits of the machine, so that the electromotive force generated in any of the out-of-phase circuits may be of any desired phase. For example: Each of the poles of the machine may be provided with a main coil of one phase and an auxiliary coil of more or less turns connected in series with the main winding of another pole and, therefore, supplied with out-of-phase current, the flux produced being resultant of the currents traversing the main and auxiliary coils. This arrangement is shown in Fig. 3.

The resultant electromotive force impressed upon a single armature coil is, as stated above, a combination of two electromotive forces, one of these components being an electromotive force in phase with the current passing through the brush 7, and the other component electromotive force having a phase opposite to that of the current from the brush 9. The resultant electromotive force thus obtained causes the current traversing the secondary circuit of the induction motor or generator to which the machine is connected, to lead in phase and, at the same time, effects a reduction in the slip of the rotor of the said motor or generator, and the greater the component electromotive force generated in the portion 10 of the coil, that is to say, the greater the component electromotive force in phase with the current passing through the brush 7, the greater the reduction in slip which is effected. By increasing the above mentioned component electromotive force a sufficient amount, it would be possible to reduce the slip to zero, and the exciter machine would then operate as a direct current generator, the induction motor or generator to which it is connected, operating as a synchronous machine. By still further increasing the component electromotive force above refererd to, the slip of the rotor of the induction machine might be made negative, so that an induction motor could be driven at a speed above its synchronous speed or an induction generator could be driven at a speed below its synchronous speed.

Several points of difference between the polyphase exciter herein described and those previously known may be referred to as follows: In the earlier exciters in which the currents of all phases were collected from one commutator, the phase of the electromotive force generated in each circuit was always in quadrature with the phase of the current in that circuit, so that, when the current in any particular circuit was leading the electromotive force generated in that circuit by the slip of the rotor, there was necessarily a component of the electromotive force generated by the exciter which was opposed to the electromotive force generated by the slip. This would have the effect of increasing the slip of the motor for a given load.

By adopting a star-wound armature and series field coils, complete control can be gained over the phase difference between the current in any circuit and the electromotive force generated in that circuit by the exciter armature. Thus, in addition to the electromotive force in quadrature with the rotor electromotive force, it is possible to have a component directly assisting the rotor electromotive force and, in that way, reduce the slip.

Where only one coil is employed on each pole, the electromotive force generated in any circuit of the rotor has a substantial component at right angles to the rotor electromotive force and also a substantial component which assists the rotor electromotive force and this arrangement is most suitable for improving the power-factor of induction motors. But it is also possible to have two or more series coils on each pole, each traversed by a current of different phase, so as to produce any desired phase of excitation of the pole, in a manner well known in the art. Furthermore, such phase of excitation can be varied at will by diverting more or less of one or another of the currents which excite that pole as shown in Fig. 4.

Where it is desired to change the slip of an induction motor throughout a wide range, the current from the coil 20, after passing through the coil 14, is made to pass through another coil on the pole 3, in such a direction as to increase the electromotive force generated in the armature coils under these poles which is in phase with the current in said coils. This has the effect of making the total electromotive force generated by the exciter more nearly in phase with the electromotive force generated in the rotor. At the same time, by reason of the excitation derived from the coil 15, a considerable leading component is obtained which can be made just as great as desired. This leading component has very little effect on the slip of the motor, but, in so far as it exists, the power factor of the motor is improved. By changing the electromotive force generated by the exciter, either by changing its speed or by diverting current from its exciting coils through the adjustable resistances, the slip of the motor for any given load can be varied over a considerable range. It is not necessary to alter the ratio between the quadrature component and the direct component for this purpose, though this can be done, if desired, by suitable diverting arrangements.

In load-equalizing systems where an induction motor provided with a flywheel is employed, the variation of speed of the flywheel is usually effected by varying the resistance in the circuit of the secondary member of the induction motor. The exciter machine of the present invention is evidently applicable to such load-equalizing systems, and serves to effect a reduction or increase in the speed of the rotor of the induction machine by varying the amount and direction of the electromotive force generated in the exciter machine in phase with the electromotive force generated in the corresponding rotor circuit of the induction machine. Such a load-equalizing arrangement is evidently much more economical than the arrangement above referred to in which power is necessarily dissipated by the resistance in the rotor circuits.

The circuit connections for the three phase induction motor having the exciter of Fig. 1 associated with it will now be traced as follows: Alternating current energy is supplied from a three phase generator 28 to the primary winding 29 of the induction motor 27. The secondary winding 26 of the induction motor 27 is connected, through collector rings 23, 24 and 25 and the brushes 32, 33 and 34, to the terminals of the exciter. If the induction motor or generator has a two phase secondary winding, the exciter will preferably be provided with four field poles. It is evident that the exciter may be adapted for use with single phase or two phase motors or generators as well as with three phase machines, and I desire that all modifications of the subject matter illustrated which do not depart from the spirit of my invention shall be included within its scope.

I claim as my invention:

1. A dynamo-electric machine comprising a commutator, an armature having star-connected coils severally connected at one end to the bars of the commutator, field magnet polar projections, a plurality of current-collecting devices adapted to be connected to all of the coil portions connected to said commutator and disposed under the respective polar projections, and windings severally disposed on said projections to induce in certain groups of said coils currents respectively out of phase with the electromotive forces in the winding on the corresponding projection.

2. The combination with a polyphase electrical circuit, of a polyphase electric current generator comprising field magnet polar projections, a commutator, an armature having a plurality of star-connected coils severally connected at one end to the bars of the commutator, a plurality of current-collecting devices adapted to be connected through the commutator to all of the coil portions connected to said commutator and disposed under the corresponding polar projection, and series windings severally disposed on said projections and severally connected to the phases of said circuit to produce a magnetic flux for generating currents in the coils connected to the corresponding current-collecting device out of phase with the voltage of corresponding phase of said circuit.

3. A dynamo-electric machine comprising a plurality of uniformly spaced polar projections, an armature having a star-connected set of coils severally connected at one end to the commutator bars, a plurality of current-collecting devices adapted to be connected to all of the coil portions connected to said commutator and disposed under the respective polar projections, and windings for said projections severally connected to the corresponding device, each armature coil having a pitch varying from the polar pitch to produce in the associated projection a predetermined commutating flux for the corresponding coils.

4. The combination with a polyphase electrical circuit, of an alternating-current machine comprising a plurality of uniformly spaced polar projections, an armature having star-connected coils severally connected at one end to the commutator bars, a plurality of brushes adapted to be connected to all of the coil portions connected to said commutator and disposed under the corresponding polar projection, a plurality of compensating coils associated with said projections, and a plurality of series windings severally disposed thereon and severally having one end connected through said compensating windings to the corresponding brush and the other end connected to the phases of said circuit.

5. The combination with a source of polyphase alternating current energy, of a dynamo-electric machine having a commutator, series field magnet windings, a star-connected armature winding and a plurality of commutator brushes which are severally connected to the phases of said source through the corresponding series field magnet windings of the machine.

6. The combination with a source of polyphase alternating current energy, of a dynamo-electric machine comprising a commutator, a star-connected armature winding, a plurality of field poles, the number of which is determined by the number of phases of said source, series field magnet windings, and a plurality of commutator-brushes severally connected to the phases of said source through the corresponding series field magnet windings of the machine.

7. The combination with a source of polyphase alternating current energy, of a dynamo electric machine comprising a commutator, a star-connected armature winding, a plurality of field magnet polar projections, a plurality of commutator brushes adapted to be connected to all of the armature coil portions connected to said commutator and disposed under the corresponding projection, and a plurality of field magnet windings connected in series with the corresponding brush and with the phases of said source to generate polyphase alternating currents in the armature winding having a frequency independent of the speed of the machine.

8. A dynamo-electric machine comprising a frame having a plurality of polar projections, a therein disposed rotor comprising a commutator and a plurality of coils severally connected to the commutator bars, a plurality of current-collecting devices disposed around said commutator and adapted to be connected to all of the coil portions connected to said commutator and disposed under the respective polar projections, a plurality of exciting windings disposed around said polar projections, and a plurality of compensating windings severally disposed in the faces of said projections and connected to the corresponding exciting winding and the corresponding current-collecting device.

9. A dynamo-electric machine comprising a frame having a plurality of spaced polar projections, a therein disposed rotor comprising a commutator and a plurality of star-connected coils severally having one end connected to the commutator bars, a plurality of brushes disposed around the commutator at intervals corresponding to the polar pitch and adapted to be connected to all of the coil portions connected to said commutator and disposed under the respective polar projections, a plurality of exciting windings severally disposed around said polar projections, and a plurality of compensating windings severally disposed in the faces of said projections to distribute substantially equal total fluxes to the several coils under the corresponding brush and connected in series with the corresponding exciting winding and the corresponding brush.

In testimony whereof, I have hereunto subscribed my name this twenty-seventh day of November, 1909.

MILES WALKER.

Witnesses:
 Louisa Ashley,
 Eveline Walker.